United States Patent
Whelan et al.

(10) Patent No.: US 12,025,766 B2
(45) Date of Patent: Jul. 2, 2024

(54) METAL DETECTOR

(71) Applicant: Minelab Electronics Pty. Limited, Mawson Lakes (AU)

(72) Inventors: Benjamin James Whelan, Mawson Lakes (AU); Gregory Peter Harmer, Mawson Lakes (AU); Ivan Anthony Curtis, Mawson Lakes (AU); Philip Shane Wahrlich, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 33 days.

(21) Appl. No.: 17/629,855

(22) PCT Filed: Jul. 27, 2020

(86) PCT No.: PCT/AU2020/000073
§ 371 (c)(1),
(2) Date: Jan. 25, 2022

(87) PCT Pub. No.: WO2021/016649
PCT Pub. Date: Feb. 4, 2021

(65) Prior Publication Data
US 2022/0276404 A1 Sep. 1, 2022

(30) Foreign Application Priority Data
Jul. 26, 2019 (AU) .............................. 2019902673

(51) Int. Cl.
*G01V 3/38* (2006.01)
*G01V 3/165* (2006.01)
*G01V 3/10* (2006.01)

(52) U.S. Cl.
CPC ................ *G01V 3/38* (2013.01); *G01V 3/165* (2013.01); *G01V 3/10* (2013.01)

(58) Field of Classification Search
CPC . G01V 3/38; G01V 3/165; G01V 3/16; G01V 3/10; G01P 15/18; G01C 21/16;
(Continued)

(56) References Cited

U.S. PATENT DOCUMENTS

| | | |
|---|---|---|
| 6,609,451 B1 | 8/2003 | Inoue et al. |
| 10,073,186 B1 * | 9/2018 | Olsson ..................... G01V 3/10 |

(Continued)

FOREIGN PATENT DOCUMENTS

| | | | | |
|---|---|---|---|---|
| WO | WO-2006037176 A1 * | 4/2006 | ............. | G01V 3/104 |
| WO | 2012097416 A1 | 7/2012 | | |
| WO | WO-2012097416 A1 * | 7/2012 | ............ | F41H 11/136 |

*Primary Examiner* — Jermele M Hollington
*Assistant Examiner* — Suresh K Rajaputra
(74) *Attorney, Agent, or Firm* — The Webb Law Firm (57) ABSTRACT

Provided is a method for detecting a target using a metal detector, including transmitting a transmit magnetic field using a transmitter; determining positions of a receiver of the metal detector as the receiver changes positions; receiving receive magnetic fields due to the transmit magnetic field to produce receive signals associated with positions using the receiver and receive electronics; and producing an audio output signal. The audio output signal is dependent on one or more receive signals associated with positions related to a current determined position in a selected relationship.

12 Claims, 5 Drawing Sheets

(58) Field of Classification Search
CPC .............. G01C 21/3804; G06T 19/006; H04N 23/6811; H04N 5/445; H04N 7/142; F28F 13/003; G06K 19/06037; F28D 2021/0029
See application file for complete search history.

(56) References Cited

U.S. PATENT DOCUMENTS

| | | | |
|---|---|---|---|
| 10,175,350 B1 | 1/2019 | Tsokos et al. | |
| 10,809,408 B1* | 10/2020 | Olsson ................... | G01V 3/165 |
| 2005/0253711 A1* | 11/2005 | Nelson .................. | F41H 11/136 |
| | | | 340/552 |
| 2013/0057249 A1* | 3/2013 | Winter ..................... | G01V 3/38 |
| | | | 324/67 |
| 2013/0147487 A1* | 6/2013 | Harmer ................... | G01V 3/30 |
| | | | 324/329 |
| 2014/0132269 A1* | 5/2014 | Olsson .................... | G01V 3/08 |
| | | | 324/326 |
| 2018/0252835 A1* | 9/2018 | Deng ..................... | G08B 21/24 |

* cited by examiner

METAL DETECTOR

CROSS-REFERENCE TO RELATED APPLICATIONS

This application is the United States national phase of International Application No. PCT/AU2020/000073 filed Jul. 27, 2020, and claims priority to Australian Provisional Patent Application No. 2019902673 filed Jul. 26, 2019, the disclosures of which are hereby incorporated by reference in their entirety.

BACKGROUND OF THE INVENTION

Field of the Invention

The present disclosure relates to a metal detector.

Description of Related Art

The general forms of most metal detectors which interrogate soil are either handheld battery-operated units, conveyer-mounted units, or vehicle-mounted units. Examples of handheld products include detectors used to locate gold, explosive land mines or ordnance, coins and treasure. Examples of conveyor-mounted units include fine gold detectors in ore mining operations, and examples of a vehicle-mounted unit include a unit to locate buried land mines.

These metal detectors usually, but not necessarily, consist of transmit electronics generating a repeating transmit signal cycle of a fundamental period, which is applied to an inductor, for example a transmit coil, which transmits a resulting time-varying magnetic field, sometimes referred to as a transmit magnetic field.

These metal detectors may also contain receive electronics that process a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or demodulated, to produce one or more target channels, the one or more target channels may be further processed to produce the indicator output signal.

The present disclosure describes herein a few alternatives to provide new functions and features to a metal detector.

SUMMARY OF THE INVENTION

In a broad aspect of the present disclosure, there is provided a metal detector with improved features.

According to a first aspect of the present disclosure, there is provided with a method for detecting a target using a metal detector, comprising: transmitting a transmit magnetic field using a transmitter; determining positions of a receiver of the metal detector as the receiver changes positions; receiving receive magnetic fields due to the transmit magnetic field to produce receive signals associated with positions using the receiver and receive electronics; producing an audio output signal, wherein the audio output signal is dependent on one or more receive signals associated with positions related to a current determined position in a selected relationship.

In one form, the audio output signal is further dependent on a current receive signal associated to the current determined position.

In one form, the one or more receive signals associated with positions related with the current determined position comprises one or more previous receive signals associated with positions related to the current determined position.

In one form, the receive signal associated to the current determined position comprises a current receive signal, or a previous receive signal, or both, associated to the current determined position.

In one form, the receive signals associated with positions are further associated with information regarding the receive signals.

In one form, the selected relationship is such that the one or more previous receive signals are associated with positions within a predetermined distance from the current determined position.

In one form, the selected relationship is such that the one or more previous receive signals are associated with positions where the receiver has been within a predetermined time period ago.

In one form, the metal detector is controllable to be in a metal detection mode or a pinpoint mode; wherein during an operation of the metal detector in the metal detection mode, the receiver is swung side-to-side; and during an operation of the metal detector in the pinpoint mode, the receiver is moved close to an area of interest; and wherein the audio output signal in the pinpoint mode is used to present the position or identity, or both, of the target to a user of the metal detector.

In one form, during the pinpoint mode, the receive signals are processed such that the audio output signal is not affected by a change of a height of the receiver from the target.

In one form, the audio output signal is modulated to indicate a current proximity to the target.

In one form, the audio output signal is modulated to indicate the identity of a target.

In one form, the current receive signal and the one or more previous receive signals are used to reduce unwanted noise.

In one form, the positions of the current receive signal and the one or more previous receive signals are aggregated to reduce unwanted noise.

In one form, the audio output signal is configured to discriminate the target from one or more other targets within a close proximity from the target, where the close proximity means within 0 to 10 cm away.

According to a second aspect of the present disclosure, there is provided a metal detector configured to perform the method of the first aspect.

According to a third aspect of the present disclosure, there is provided a non-transitory computer readable medium, comprising instructions to perform the method of the first aspect.

BRIEF DESCRIPTION OF THE DRAWINGS

Embodiments of the present invention will be discussed with reference to the accompanying drawings wherein.

DESCRIPTION OF THE INVENTION

Alternatives to provide new functions and features to a metal detector will be discussed in turn below:
Connectivity with other Devices
Enhanced Audio Mode
Flexible Video Mode
Heatsinking
Camera and Inertial Measurement Unit (IMU)
Low Latency Video Output
Fiducial Markers
Heat Map Display
Miscellaneous In this document, unless stated otherwise, Inertial Measurement Unit or IMU means an electronic device that measures and reports a body's specific acceleration, angular rate, and sometimes the orientation of the body, using a combination of accelerometers, gyroscopes, and sometimes magnetometers.

In this document, unless stated otherwise, Augmented Reality or AR means a technology that superimposes a computer-generated image on a user's view of the real world, thus providing a composite view. In the field of metal detection, it may mean superimposed computer-generated images representing useful information on a captured video (which may be real-time) or photos. It may be presented to a user of the metal detector on a screen, or a head-mounted display, or a pair of smart glasses.

In this document, unless stated otherwise, a user and an operator mean the same, which is a person or a robot or an Artificial Intelligence (AI) using a metal detector.

In this document, unless stated otherwise, the term "pose" in the context of "pose" of an object means position and orientation of that object. Usually, but not necessarily so, a pose has six degrees of freedom (x, y, z, pitch, roll, yaw as understood by a person skilled in the art).

Connectivity with Other Devices

This part discloses embodiments of a metal detector with capabilities to be linked or connected with other devices. The metal detector may be linked or connected to a device, such as a phone, tablet, watch, computational unit or other smart device via a wired or wireless interface (such as WiFi, Bluetooth ZigBee, Software Defined Radio, Ultra-Wideband Technology or other) or via Internet. Software loaded on the device (commonly referred to as an app) will be capable of interfacing with the metal detector, allowing for computations for the metal detector or configuration, or both, of the metal detector via the app. The app, for example, may perform all or part of the calculations required for the positioning algorithm and provide results to the detector to be presented to the user via the audio signals or the display or both.

The app may present a User Interface (UI) which is a duplicate of the detector's interface (commonly referred to as a virtual control panel) or it may present a completely different UI more suited to the device. For instance, if the device is a phone or a tablet, the UI may be more suited to a touch screen, with drop-down selections, check boxes, clicking on one setting advances to another screen where more options appear, etc. The app may have the ability to provide a custom UI based on user preferences, including the ability to change colours and contrast for people who may be visually impaired.

It will be appreciated that the options available on the app may be exactly the same as what is available on the detector. Alternatively, they could be a subset or superset of the options available on the detector. For example, advanced or expert options may only be made available via the app only.

It will be appreciated that different configuration profiles for the detector may be saved and loaded on to the device. By virtue of the storage capacity of most smart devices, a large number of preconfigured configuration profiles may be saved. These profiles may be for different users, or for different detection environments, or they could be set to offer differing setting complexities, e.g., to provide profiles for children or inexperienced users to have access to basic settings only. Users may make configuration profiles available to other users via the app, which provides a number of benefits. For example, inexperienced users may quickly configure their detector according to a configuration profile that is shared with them by an instructor or expert user. This allows the inexperienced user to easily configure their detector in an optimal manner without requiring the user to be familiar with all aspects of the detector configuration.

Knowledge of the detector's position may allow for the mapping of detector-related information. The mapping may be relatively coarse, using GPS, and/or relatively fine such as building a map of an area at centimetre scale (or smaller) by making predictions about the detector's position from a motion model (e.g. visual inertial odometry or dead reckoning with an IMU, where dead-reckoning is the process of calculating one's current position by using a previously determined position, or fix, and advancing that position based upon known or estimated one or more of speeds, accelerations and angular velocities, over elapsed time and course). Coarse data may be used to show a map of where detecting has previously occurred, and the user may select a detection location and zoom in to show the map of the fine data. The fine data may be restored between sessions and/or shared between users by employing persistent spatial anchors.

Optionally, maps and information that have been created by one user may be shared between other users of the device. The app may also integrate with other services such as social media platforms. The user may upload information about their hunts to such a service from the field, such as Facebook or Twitter. The user may take a photo of a find, which may then be analysed by a cloud service to identify it using an image classification service. The app could also suggest sites for the user to search. This could be based upon where other users have made finds (if they choose to share that information).

The app could also cross-reference other sources of mapping information using the user's GPS location. This may allow the app to do things like show where historical buildings or human activity were present, relative to their current location. It may also do things like alert a user when they are at a location where a prospecting license may be required. The app could also indicate to the user what their settings were when each location was previously searched. This allows a user to quickly return to settings that they previously found were best suited for a given area.

It will be appreciated that by virtue of the internet connectivity of smart devices, the app may be capable of manually or automatically downloading and updating the metal detector firmware. In one form, the app may send data to be processed in the cloud and then may receive the results sent back from the cloud. In another form, settings of the detector may be stored in the cloud, not only in the metal detector.

The app may also provide a digital user manual for the detector being used and provide convenient links to instructional and training videos that demonstrate the use of the detector, providing hints on improving the user skills. The app may also create an album of finds, where the user takes a photo and the app stores the time, date and location of that find. The app could also have a messaging aspect, where users may message one another in groups or individually.

Enhanced Audio Mode

It is common for metal detectors to generate audio outputs to their users or operators. In such cases, typically an amplitude-modulated, pulse-width modulated, or pitch-modulated, or a combination of amplitude-modulated and pitch-modulated, audio output indicates to a user that there is a metallic object in a detection zone, and the properties of the audio convey information regarding the nature of the detected object.

In existing detectors, the information used to produce the characteristics of the audio, such as pitch and volume (or loudness in the case of pulse-width modulation), is typically the phase and amplitude information of the signal. In multi-frequency detectors, the relative amplitudes of the demodulated channels, or the outputs of a processing step that is applied to the demodulated channels, may be used instead of a single phase. Some processing including, but not limited to, filtering, is typically applied to improve the stability of the audio output. However, the desire for low latency and responsiveness means that this processing is often designed to be as minimal as possible.

Sources of noise such as electromagnetic interference (EMI) and signals from the soil that the coil is being swept over may also result in audio outputs being generated by the detector. Due to these signals being unrelated to the target, the audio outputs produced by the noise sources may inhibit the user's ability to accurately distinguish and interpret the audio outputs produced as a result of the detection of a target of interest. In one instance, the noise sources may produce frequent audio alerts that are difficult for the user to distinguish from audio alerts generated by the detection of desirable targets. In order to mitigate the detrimental impact of the noise, the user will typically lower the sensitivity of the detector to a level at which noise no longer produces substantial audio outputs. Doing so necessarily lowers the sensitivity of the detector to targets of interest, and therefore decreases the number of desirable targets that the user will be able to find. The presence of noise may additionally impact upon the characteristics of the audio alert during the detection of a desirable target. For instance, the addition of noise to the signal generated by detection of a desirable target may alter the pitch of the signal. The altered pitch may cause the user to disregard the audio alert in the belief that it does not correspond to a desirable target and therefore mislead the user about the presence of that target, decreasing the number of desirable targets that the user will find.

Further, even when the impact of noise on the audio output is small, the presence of multiple metallic objects in close proximity may result in audio output that is difficult for the user to interpret. For example, in a detector in which the pitch of the audio output is related to the estimated characteristic relaxation frequency of the target, the superposition of receive signals from multiple different targets may result in an audio pitch that corresponds to only one of those targets, or an audio pitch that varies between the pitches corresponding to each target during the course of a single detection, or an audio pitch that does not correspond to any of those that would be heard were the targets detected in isolation. As a consequence, the user may struggle to accurately interpret the audio in order to determine the properties of the targets being detected. In some cases, the user may erroneously conclude that there is no target of interest present. Furthermore, some metal detectors may be configured such that they do not produce an audio output when the receive signals are interpreted as arising from some classes of targets, such as ferrous objects. In this case it is possible for the superposition of signals from desirable targets to appear as though they correspond to some other target, such as a ferrous object, in which case the detector would produce no audio alert. Thus, the user would not be alerted to the presence of desirable targets in such a case.

By virtue of the ability of the detector described in this disclosure to match detector-related information with accurate measurements of the position at which that information was measured or produced, the detector may store a history of metal detector signals measured within an area, where information from historical measurements may be combined with real-time measurements in order to produce an enhanced audio output that conveys different or more information than real-time audio alone would produce.

Figure 1:
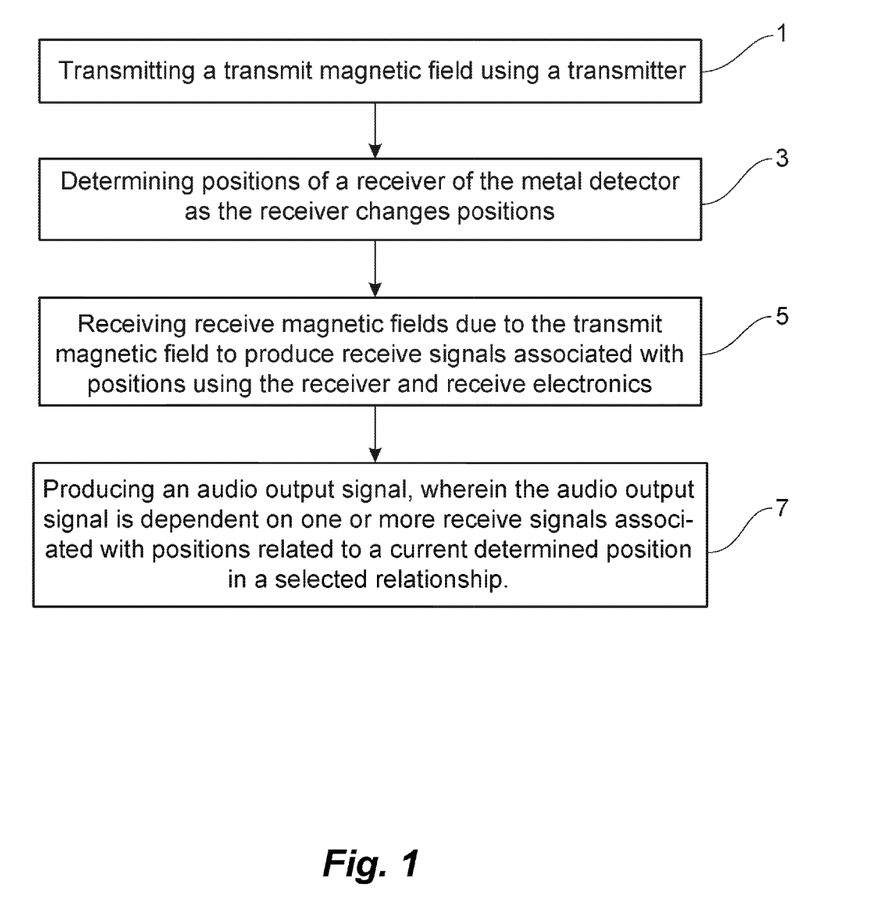
FIG. 1 depicts a broad form of the present disclosure in relation to an enhanced audio for a metal detector.

FIG. 1 depicts a broad form of the present disclosure in relation to an enhanced audio for a metal detector for detecting one or more targets in a soil. In particular, it first comprises the step 1 of transmitting a transmit magnetic field using a transmitter. Any known method of transmitting a transmit magnetic field suitable for metal detection may be used in conjunction with a suitable transmitter deemed suitable by a person skilled in the art.

The next step 3 is to determine positions of a receiver of the metal detector as the receiver changes positions. The determination of the positions may be conducted in many ways, for example, it may be done by attaching a positioning device such as a GPS device, accelerometer etc. near or on the receiver of the metal detector. The receiver may be embedded in a sensor head, and the positioning device may be attached to the sensor head or at a fixed relative position to the sensor head. The determined positions may be stored in memory or in a non-transitory computer readable medium. The memory or non-transitory computer readable medium may be part of the metal detector or may be a remote memory or non-transitory computer readable medium linked to the metal detector wirelessly or through wired connections.

The next step 5 is to receive magnetic fields due to the transmit magnetic field to produce receive signals associated with positions using the receiver and receive electronics. In this context, receive magnetics fields are magnetics fields received by the receiver of the metal detector. Receive magnetic fields due to the transmit magnetic field are the magnetic fields generated in response to the transmit magnetic field. For example, a target in an influence zone of the transmit magnetic field would have eddy current generated within, and the eddy current in turn generates a magnetic field. Once the receiver has started receiving the receive magnetic fields due to the transmit magnetic field, receive signals are generated, just like any other metal detectors. However, for this step, the receive signals are associated with positions determined in step 3 above. The association needs not be instantaneous. The association needs not be exact positions of the receiver when the receive signals are received as long as the associations are able to allow a differentiation of positions where receive signals are received. In one form, the receive signals may be processed prior to being associated with positions.

The next step 7 is to produce an audio output signal, wherein the audio output signal is dependent on one or more receive signals associated with positions related to a current determined position in a selected relationship. In simple terms, when the receiver is at a particular position, one or more receive signals recorded or associated with positions which falls within a selected relationship with that particular position would be used for processing to produce the audio signal. The audio output may be fed to a speaker or to a head phone connected wirelessly or physically to the metal detector. The audio signal of different amplitude and pitch (frequency) may indicate to a user of the metal detector extra information in relation to a target. A conventional metal detector produces an audio output which is directly dependent on the signal strength of the current receive signal. A metal detector with an enhanced audio uses one or more receive signals associated with positions related to a current determined position in a selected relationship. The selected relationship may be defined by predetermined rules. In one form of the rules, the selected one or more previous receive signals are received at positions related to the position of the current receive signal. For example, the one or more previous receive signals are associated with positions within a predetermined distance from the current determined position, such as 10 cm, 1 m, 2 m from the current position.

Alternatively, an area of soil may be sub-dived into sub-zones. A current receive signal in a particular sub-zone would be processed with one or more previous receive signals within the same sub-zone.

In another form, the selected relationship is such the one or more previous receive signals are associated with positions where the receiver has been within a predetermined time period ago. For example, such the one or more previous receive signals were received within a 1 minute 2-minute or 5-minute window.

In an alternative embodiment, the audio output signal is further dependent on a current receive signal associated to the current determined position. In other words, a metal detector with an enhanced audio uses the current receive signal and one or more receive signals associated with positions related to a current determined position in a selected relationship.

In an alternative embodiment, the one or more receive signals associated with positions related with the current determined position comprises one or more previous receive signals associated with positions related to the current determined position. In other words, when the receiver is at a current determined position, the processor will look for one or more previous receive signals associated with that same position, recorded previously, and use one or more of them for processing.

In an alternative embodiment, the receive signal associated to the current determined position comprises a current receive signal, or a previous receive signal, or both, associated to the current determined position.

In an alternative embodiment, the receive signals associated with positions are further associated with information regarding the receive signals, for example, information of the targets, the soil type etc.

The term "current" and "previous" are time relative. "Current" means a most recent receive signal that is being processed or recorded or fed as an output, or all of the above. "Previous" simply means a receive signal that is being processed or recorded or fed as an output, or all of the above, before the "current" receive signal.

In one embodiment, the enhanced audio mode makes use of the centimetre-scale, or better, positioning system to store detector data along with its corresponding measured position. In order to determine the characteristics of the audio alert such as pitch and volume, at each position in the swing the detector may estimate the properties of the sources of received signal by combining previous and current measurements. A variety of methods may be used to combine the signals, including, but not limited to: calculating a weighted average of the previous and current signals, where the contribution of each measurement to the result is weighted according to a function of the inverse of the distance between the position of that measurement relative to the position of the current measurement; optimising a cost function, such as a maximum likelihood function, that estimates the true signal properties from the previous and current measurements; using a regression model with outlier rejection, in order to fit a functional form describing the signals to the measurements in the presence of noise. The pitch and volume of the audio are determined from the combination of signals, thereby producing a new audio alert while mitigating the impact of noise on the audio output. The mitigation of noise through the aggregation of multiple measurements allows the user to effectively operate the detector at a higher sensitivity than they would otherwise be able to, and therefore be able to detect targets that would not produce a signal in a detector with purely real-time audio operating at a lower sensitivity level. In one form, the audio output signal is configured to discriminate the target from one or more other targets within a close proximity from the target, where the close proximity means within 0 to 10 cm away. Of course, if the other targets are much further away, there should be no issue for the user of the metal detector to discriminate them, as the audio signal would indicate two or more distinct targets.

In one embodiment, the detector is capable of operating in modes where either the audio is produced based on real-time measurements, or where previous measurements are recalled and are used, possibly in combination with real-time measurements, to produce enhanced audio feedback for the user. A user may manually switch between real-time and enhanced modes, or the detector may automatically switch between modes based upon an observed behaviour of the user, such as the user making a predetermined number of passes over the same patch of ground, wherein if the number of passes is exceeded, then the detector is switched to the enhanced mode as the user is presumed to be interested in finding out more detailed information about that patch of ground.

The enhanced audio mode allows the user to operate at higher sensitivities and/or noisier environments than they otherwise could, improving their detection and discrimination depths. The enhanced audio mode makes use of the centimetre-scale, or better, positioning system to store detector data along with its corresponding measured position. The detector is then able to enhance its audio output by virtue of multiple swings (or recordings) at a given location to combine past measurements with real-time measurements to average down stochastic noise such as EMI.

It will be appreciated that there are a number of methods that could be used to construct an enhanced audio output. These could be 'direct' methods, where signal properties such as phase or amplitude are averaged over multiple measurements over the same patch of ground and are then used to drive the audio output in the usual way. The averaging would likely incorporate a weighting that reflects the relative distance between the real-time measurement and the older measurements, or the time between them, or some other relationship to their relative properties.

'Indirect' methods could also be used in which more substantive processing occurs between measurements being taken and the audio output being constructed. This could be some 'sharpening' of the signals in which previous and current metal detector and position measurements are used to first identify the presence of desirable targets in a detection area and then accentuate in the audio output particular properties of the signal, such as the contribution to the signal from the nearest desirable target at the current coil position. The processing used to determine the number and position of targets in the detection area could be a clustering algorithm to assist in the identification and location of targets, or an inversion algorithm to solve for the target properties, such as relaxation frequency and depth, or another applicable technique.

The relative magnitudes of the receive signal at multiple positions in close proximity to the target is informative of the depth at which the target is buried. Targets that are buried as shallow depths tend to generate large receive signal magnitudes that are sharply peaked around the target location. In contrast, targets that are buried at deeper depths tend to generate small receive signal magnitudes that are broadly peaked around the target location. Therefore, the spatial broadness of the magnitude of the receive signal around the location of the target may be used to estimate the target depth and this estimate may be conveyed to the user in order to assist in retrieval of the target, and/or to assist in the decision of whether or not to attempt a target retrieval. There are many well-known measurable metrics of the spatial broadness of the magnitude of the receive signal around the location of the target, such as the full width at half maximum, half width at half maximum, and the standard deviation of the signal density.

In another embodiment, the enhanced audio output may be produced using substantially different processing to real-time audio. The detector could use historical measurements in a way that changes the information content of the audio for the user. For example, if the target positions and properties are known (as a result of processing measurements obtained during multiple passes over the same patch of ground), a forward model could then be used to produce entirely synthesized audio in the detector that mimics what would be heard when detecting those targets in the absence of noise, such as that from EMI or the soil. This improves the clarity of the audio alert for the user. The synthesized audio output that corresponds to what would be heard in the case where the measured noise was negligible, thereby providing the user with an audio alert that better represents the desirable targets being detected.

In another example, if a processing step has identified the presence of a plurality of targets in close proximity, the enhanced audio could be used to produce entirely synthesized audio that corresponds only to the target that is closest to the centre point of the coil as the coil is swung, rather than audio that is generated from input signals that contain a superposition of responses from the targets. It will be appreciated that this allows for a clearer distinction between the targets in audio, as the user will hear a plurality of distinct tones with an instantaneous switch between those tones, rather than a smoothly-varying blend of tones.

Figure 2A:
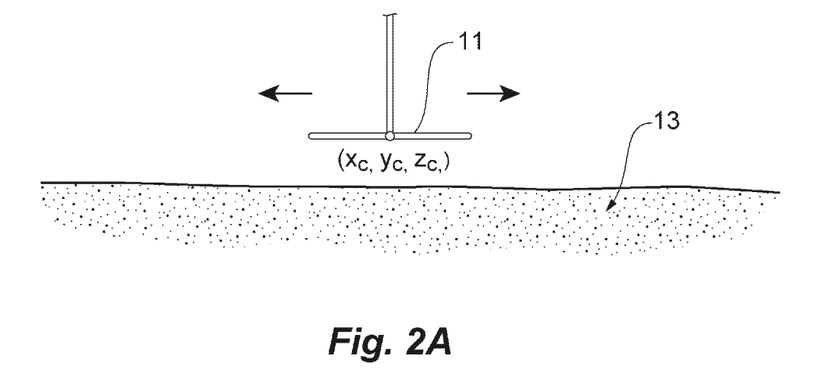
FIGS. 2A to 2C depict an exemplary embodiment in relation to target discrimination using an enhanced audio for a metal detector.
Figure 2B:
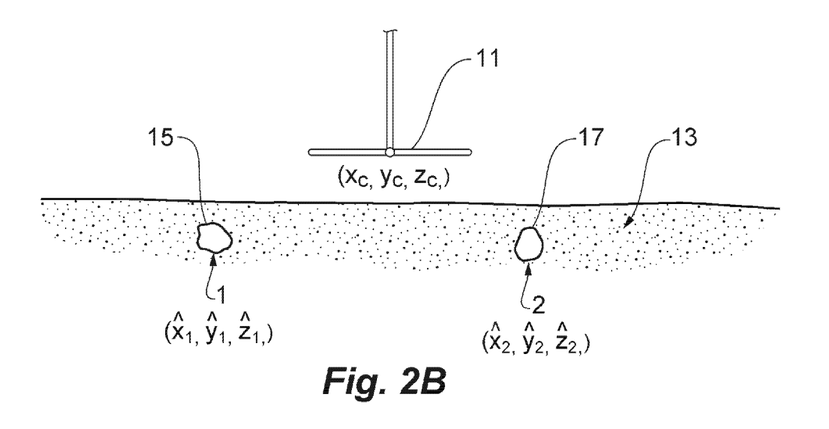
Figure 2C:
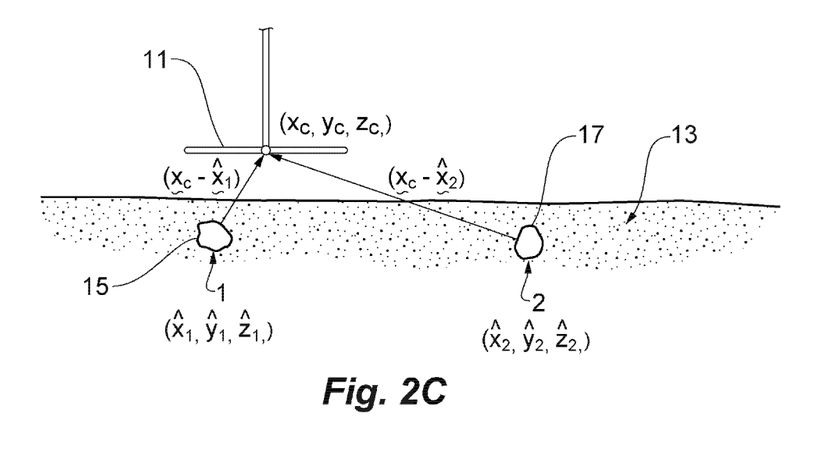

FIGS. 2A to 2C depict an exemplary embodiment in relation to target discrimination using an enhanced audio for a metal detector. In FIG. 2A, there is a sensor head 11 of a metal detector which comprises a receiver for receiving a receive magnetic field. A transmitter may be provided in the same sensor head 11. During normal operation of a metal detector, the metal detector would be moved from side-to-side above soil 13. The metal detector may be handheld, mounted on a robotic arm of a vehicle or a robot.

In an example, consider a user detecting in an area that contains two metallic targets 15, 17 buried within the soil 13. Consider a Cartesian coordinate system in which the surface of the soil 13 is in the x-y plane and the z axis therefore forms the normal to the surface of the soil 13. The two targets 15, 17 will be located at positions $x_1=(x_1, y_1, z_1)$ and $x_2=(x_2, y_2, z_2)$, respectively. The targets 15, 17 have characteristic relaxation frequencies $\zeta_1$ and $\zeta_2$ that, when detected by the metal detector, produce received response signals $f(\zeta_1)r_1[x_c(t)]$ and $f(\zeta_2)r_2[x_c(t)]$, respectively, where the functions $r_i[x_c(t)]$ describe the inductive coupling between the metal detector and the $i^{th}$ target for i=1, 2 at time-dependent coil position $x_c(t)=[x_c(t), y_c(t), z_c(t)]$, and the function $f(\zeta)$ describes the responses of a plurality of channels to a target of characteristic relaxation frequency $\zeta$. The total response induced in the detector is therefore the sum of the individual target responses, in the absence of other sources of signal: $R[x_c(t)]=f(\zeta_1)r_1[x_c(t)]+f(\zeta_2)r_2[x_c(t)]$. Consider that the user presses a button to instruct the metal detector to activate the enhanced audio mode processing, then sweeps over the detection area for a period of 5 seconds. During this 5 second period which the metal detector records the responses $R[x_c(t)]$ and the corresponding coil positions $x_c(t)$ at which those responses are measured at a sample rate of 100 Hz. At the conclusion of the 5 second period, the metal detector has therefore buffered 500 such measurements. Following a second input being provided by the user, the metal detector applies a processing method to the 500 recorded measurements to provide an estimate of each target position $\hat{x}_i$ and characteristic relaxation frequency $\hat{\zeta}_i$ as a function of coil position $x_c(t)$. In this example, the processing method is a least-squares fit to the measured signals $R[x_c(t)]$ where the target properties are the unknowns, in which a model of the response of the metal detector as a function of coil position, target position and target characteristic frequency is used to calculate a predicted metal detector response $\hat{R}[x_c(t)]$. Therefore, the processing step minimises $\Sigma_{j=1}^{500}(R[x_c(t)]-\hat{R}[x_c(t)])^2$ with respect to the estimated target properties $(\hat{\zeta}_1, \hat{\zeta}_2, \hat{x}_1, \hat{x}_2)$.

Following the processing step in which the metal detector has estimated the target properties $(\hat{\zeta}_1, \hat{\zeta}_2, \bar{x}_1, \hat{x}_2)$, the metal detector begins to produce enhanced audio output. The enhanced audio output is generated as the user swings the metal detector coil over the detection area after the 5 second period during which data was collected. In this example, the audio output is enhanced by determining, for every measured coil position $x_c(t)$ during this subsequent detection period, which of the two targets is closest to the centre of the metal detector coil. This is achieved by finding the minimum of $\|x_c(t)-\hat{x}_1\|$ and $\|x_c(t)-x_2\|$. Given the target that is closest to the coil position $x_c(t)$, the metal detector synthesizes an audio output that is equivalent to that which would be produced if the metal detector was detecting that target in isolation, which is the audio output corresponding to a synthesized metal detector response $R^{synth}[x_c(t)] = f(\hat{\zeta}_i)\hat{r}_i[x_c]$, where $\hat{r}_i[x_c(t)]$ is the estimated inductive coupling of the target to the metal detector based upon the estimated target position $\hat{x}_i$. Thus, the synthesized response that is used to generate the enhanced audio alerts is calculated according to the following logic:

$$R^{synth}[x_c(t)] = \begin{cases} f(\hat{\zeta}_1)\hat{r}_1[x_c(t)] & \text{if } \|x_c(t) - \hat{x}_1\| \le \|x_c(t) - \hat{x}_2\| \\ f(\hat{\zeta}_2)\hat{r}_2[x_c(t)] & \text{otherwise} \end{cases}$$

The enhanced audio output therefore provides the benefit to the user of being able to more easily distinguish the two metallic targets 15, 17. Whereas the measured real time response $R[x_c(t)]$ is a superposition of target responses, which may cause the real time audio output behaviour to be complex and difficult for the user to interpret, and potentially cause the user to erroneously conclude that no target of interest is present, the synthesised synthesized response $R^{synth}[x_c(t)]$ clearly alerts the user to the presence of two distinct targets 15, 17 and permits the enhanced audio output to accurately convey to the user the nature of each individual target 15, 17. Consequently, the user is better able to determine whether a target of interest has been detected. In this example, the metal detector continues to produce enhanced audio output until the user presses a button to instruct the metal detector to revert to producing real-time audio output.

It will be appreciated that the above example describes just one embodiment of enhanced audio output. The example may be extended to accommodate more than two targets. The example may be extended to synthesize the response from a metallic target while removing the response from undesirable sources, such as the soil 13. The example may be modified in order to remove the need for the user to manually engage the enhanced audio mode. The example may be modified so that the measurements used for the estimation of target properties are updated as more measurements are collected, and may be updated while the enhanced audio output is being produced. The algorithm used to estimate signal source properties may be any appropriate algorithm including, but not limited to, template fitting; a machine learning regression or classification algorithm; or a likelihood estimator. The logic used to generate the synthesized response may differ from the example.

In an alternate embodiment, the enhanced audio output may be used to produce a type of pinpoint mode. A pinpoint mode is different from a usual metal detection mode. In metal detection, "pinpoint" mode or a "pinpointer" is used to identify a more precise point where the target is, as compared to a normal mode where a detector is used to scan a wide area of soil. During an operation of the metal detector in the metal detection mode, the receiver is swung side-to-side; and during an operation of the metal detector in the pinpoint mode, the receiver is moved close to an area of interest; and wherein the audio output signal in the pinpoint mode is used to present the position and/or identity of the target to a user of the metal detector. Rather than using DC-coupled signals, as is typical for a pinpoint mode, the previously-obtained measurements from the user's swing could be processed to determine where targets are and their properties (frequency, phase). Knowing that information, pinpoint audio may be synthesized that reflects target IDs and positions and is less susceptible to ground noise than DC-coupled measurements, since the measurements used to make the pinpoint mode were obtained in AC-coupled mode. Here, the algorithm driving the pinpointing audio is no longer required to perform a baseline subtraction of signals as in the DC-coupled mode which, in the presence of strong signals from the soil 13, may behave erratically when the estimation of the baseline signal is poor.

Knowledge of the coil height above ground may be used to avoid problems inherent in existing pinpoint audio algorithms. In existing pinpoint audio algorithms, DC-coupled signals are used to estimate a baseline signal value and the audio output pitch or volume or a combination thereof are used to indicate to the user an increase in the received signal above that baseline. If the user raises the coil after activating the pinpoint mode, the corresponding decrease in receive signal amplitude results in a corresponding decrease in the audio output. If the user raises the coil sufficiently high, no audio output will be produced. Conversely, if they lower the coil towards the ground, audio may be produced well away from the true target position. These cases may cause frustration and a poor user experience, particularly for users that are not expecting this behaviour. The detector described in this invention may use the measured coil height to compensate for changes in that height to produce more stable pinpoint audio. To do this, the detector will record the coil height above ground at the time of the pinpoint mode being activated. At subsequent times during operation of the pinpoint mode, the current coil height is compared to the coil height recorded at the time of pinpoint mode activation. Using a model of target signal amplitude as a function of the distance from the coil, a compensation factor may be calculated that accounts for the difference in measured signal that results from the variations in coil height. The compensation factor is used in the calculation of the audio output in order to render the pinpoint audio output substantially invariant to the coil height.

Flexible Video/Visual Inertial Odometry (VIO) Mode

Some metal detectors offer visual displays to assist their users. In particular, visual displays may be used to assist a user or operator to identify and record the location of an object in a detection zone. For example, a map shown in a visual display may be marked with locations where objects of interest were discovered. Further, a heat map or contour map shown in a visual display may be used to guide a user to cover an area of interest effectively. For example, areas that had been covered may be shaded in a selected colour so that the user will be guided by the heat map to move to areas that are unshaded in order to search regions of the environment which have not yet been interrogated. Further information associated with the interrogated regions of the environment may also be displayed. For example, areas which are suspected to contain a target of interest may be annotated with derived information associated with the target, for instance the estimated depth of the target in the ground, and properties such as a label representative of the estimated type of target. However, a metal detector may use camera-based vision applications that enhance discrimination and detection. For example, a camera is used to provide a real time video feed to the display unit. In one example, the camera is mounted inside the display unit, where it is looking out from the display unit. The camera may be looking down the shaft of the metal detector coil and the ground in front, to provide a real time video feed to the display unit for the user.

A user may see the video while using the metal detector. However, if the video is always "on" for a metal detector, the operation time of the metal detector without requiring the battery to be charged again would be shortened.

Accordingly, in one embodiment, the system may operate in a metal detector only mode without turning on the video, which consumes less power and therefore has longer operation time for any given battery capacity.

In an advanced detector, one may include a Visual Inertial Odometry (VIO) process to determine the position and orientation of a metal detector by analysing the associated camera images, combining with data from an IMU. The process that consumes a large amount of the processing capacity (and therefore power) is often the odometry task by the VIO process. It may be advantageous to allow the user to view a live camera feed and take still pictures while the odometry is disabled, and still realize a power reduction. Also, it is desirable that the IMU still be enabled, so that gestures etc. may still be processed.

In one embodiment, a metal detector includes separate processor units for processing metal detection signals and for VIO processing. In another form, the Real-Time Processing Unit (RPU) grabs data from a camera and an IMU, and passes it on to the Application Processing Unit (APU) which runs the VIO algorithm with acceleration in a FPGA. The power is controlled by adjusting the clock speed of the various processors. If a processor is not required at all, that processor is powered off.

In one embodiment, a metal detector with a visual display and VIO includes three operating modes when the metal detector is used to detect targets: one with "on" VIO mode, one with "standby" VIO mode and one with "off" VIO mode.

When the metal detector is turned on, i.e., system on, the metal detector checks its settings which mode it is set to operate in. Alternatively, the metal detector may prompt a user to select one of the available modes.

In "off" VIO mode, the system may scale down the APU as the processing will be simpler (there is no video feed or only direct video feed without VIO processing) and may turn off the RPU as there is no vision at all.

In "on" VIO mode, the system provides vision and metal detection and full VIO processing. On boot up, the device checks whether the user wants vision and VIO and, if so, would set up the system to support vision and VIO processing and metal detection.

In "standby" VIO mode, not all of the VIO components are off completely, but is running with reduced performance (for example, at lower frame rate, or tracking less features, or not performing loop closure etc.). This would be a shorter start up time when/if the user decided to turn VIO back on. Some parts, such as the IMU is still fully functional so data from IMU may still be used for other processes, such as detecting a gesture from a user of a metal detector to initiate a function.

Figure 3:
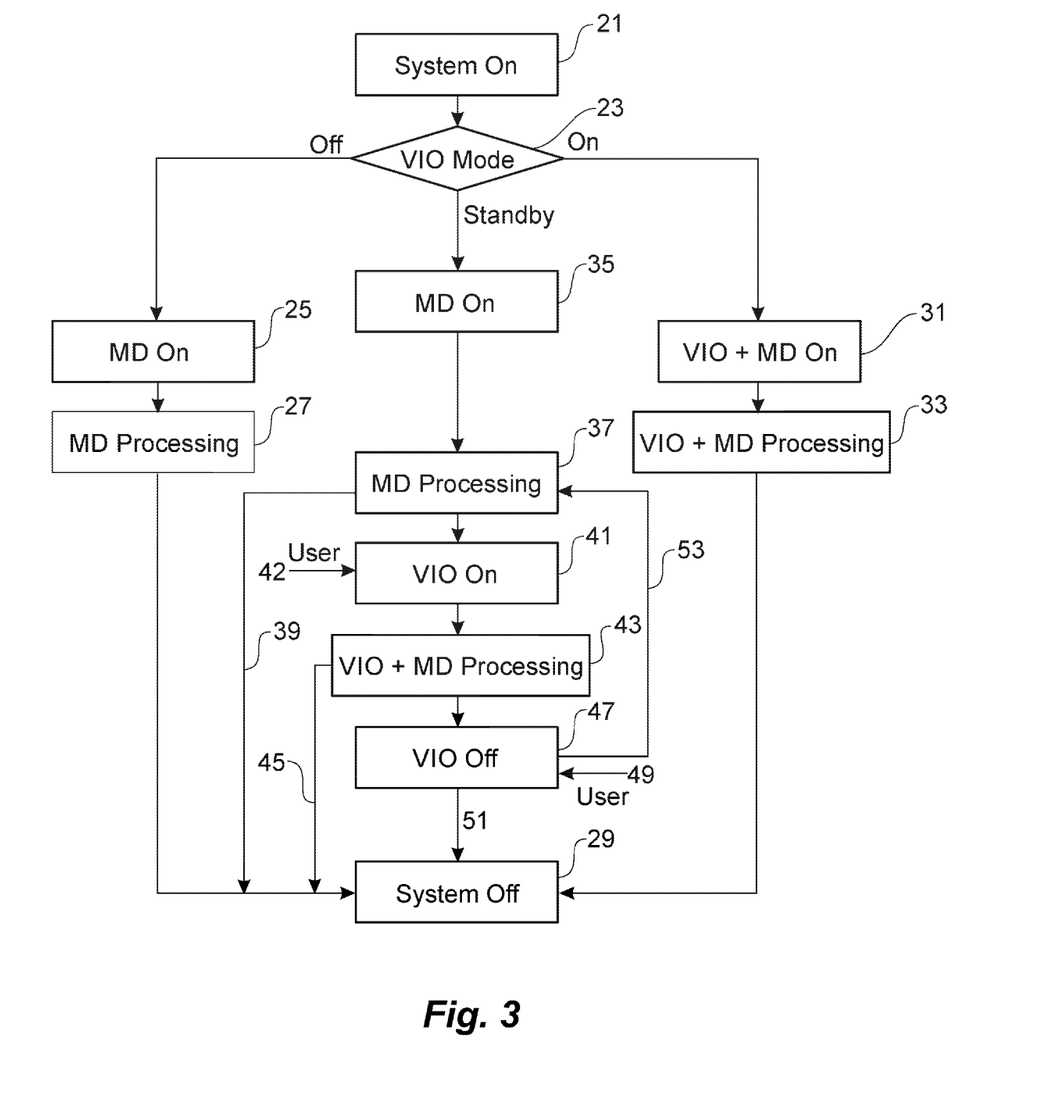
FIG. 3 shows an exemplary flow chart of the control of the metal detector with flexible video mode.

FIG. 3 shows an exemplary flow chart of the control of the metal detector. As the first step 21, the system of the metal detector is initiated. The system then checks a setting or parameter for the VIO mode 23, which is used to indicate whether the VIO mode is "off", "on" or on "standby". If the VIO mode is "off", then the metal detection is turned on 25, and the data from the metal detection is processed 27, until the system is turned off 29. If the VIO mode is "on", then the metal detection and the vision modules, including VIO is turned on 31, and the data from the metal detection and the VIO modules are processed 33, until the system is turned off 29. If the VIO mode is on "standby", the metal detection is turned on 35, and the data from the metal detection is processed 37. The system may be turned off 29 as indicated by path 39 without having to fully turn on the VIO mode (for example, only the IMU is working, or VIO mode operating at half rate). During the operation of the metal detection, it is possible to turn on the VIO mode 41, for example through user input 42. In such a case, the metal detection and the VIO modules are working at the same time, and the data from the metal detection and the VIO modules are processed 43, until the system is turned off 29 as indicated by path 45. Alternatively, the VIO mode may be turned off 47 independently based on a user input 49 before the system is turned off 29 as indicated by path 51, or the VIO mode may be turned off 47 independently based on a user input 49 with the metal detection still operating (i.e. back to 37 as indicated by path 53).

Heatsinking

In a metal detector, processing blocks and Field Programmable Gate Array (FPGA) fabric may be contained in a System on Chip (SoC) Integrated Circuit (IC). The SoC-IC is a source of heat during operation. Most metal detectors are with a user display and user input panels. For some handheld metal detectors, user display and user input panel are located in a pod, which is a part of a metal detector near or on top of a handle bar which often includes user interface of the metal detector. When said source of heat is within the pod, the performance of the system may decrease. There are a few alternative ways to conduct the heat out of the enclosure besides use of a conventional heatsink.

In one embodiment, the pod includes a speaker. The speaker grille may be used as a heatsink. The speaker grille may be composed of a metal, or any other material suitable to provide heat sinking functionality. The advantage of using a speaker grille as a heatsink is that there may not be a need of having a separate heatsink. Thus the overall weight and packaging of the metal detector system is improved. There may be a heat insulating material between the grille and the speaker to ensure that heat is not conducted back into the speaker. It is also to prevent heat from being conducted to components behind the speaker such as an LCD screen. In one form, the heat insulating material is spongy or flexible, to avoid or reduce the speaker vibrations affecting the SoC-IC, while still maintaining good thermal contact with the SoC-IC.

In another embodiment, there may be a separate heatsink used to conduct the heat out of the enclosure. As contrast with a conventional heatsink, the heatsink may be moulded into a case. The case may be made of plastic, polyester, polycarbonate, biopolymer, glass or any other suitable material. In another example, the case is separately moulded and the heatsink is sealed against the case. This seal may provide, for example, a waterproof seal.

Camera and Inertial Measurement Unit (IMU)

As mentioned previously, a camera may provide a real-time video to a user. In one embodiment, the camera is mounted in or near the display unit of a metal detector or mounted inside a pod, which is a part of a metal detector near or on top of a handle bar which often includes a user interface of the metal detector.

The advantage of mounting a camera inside the display unit is that it will make the overall system compact and save space. The other advantage may be that it requires less wiring since the camera is mounted inside the display unit and close to the screen. Furthermore, by mounting the camera inside the display unit, the camera will be in a protected location, and is away from the water (in a scenario where the detecting area contains water). The location of the camera is suitable for producing an AR view.

In one embodiment, there is provided a layer on the top of the lens to protect the lens of the camera. In one example, the layer may be a thin meniscus. In another example, the layer may have a curved shape like a half dome, which provides advantages over a flat shape such as the manufacturing tolerances may be less critical. Also the optical distortions produced may be easier to compensate or correct.

In one embodiment, the layer or meniscus may be made of a material with scratch and shock/impact resistance. In another embodiment, the layer or meniscus material may be Infrared (IR) transmissive. Yet in another embodiment, the layer or meniscus material may be IR transmissive with scratch and shock/impact resistance. In one example, the material may be a polycarbonate material.

A metal detector may include an IMU which may improve latency requirements in displaying the information and/or video on the display screen of the metal detector. In one embodiment, the IMU module and the image sensor IC of the camera may be mounted back to back on a circuit board to minimize the variance of the extrinsic relation between the IMU module and camera, and may remove the requirement to calibrate the extrinsic relation between IMU and camera for each unit during manufacturing, as they will be identical within an acceptable tolerance.

Low Latency Video Output

As mentioned previously, a camera may be used to provide a real time video feed to the display unit. When displaying the camera feed, that is the video on the screen, the update rate must be fast enough so the user doesn't perceive any noticeable latency. That is, looking at the video on screen resembles looking directly at the ground where the camera is pointing. The minimum frame rate that allows this is in the order of 30 frames per second (fps or Hz). This equates to a period of 33 ms between frames. In one example, the frame rate may be more than 30 fps.

The amount of time that visual odometry processing takes to generate a position for any given frame may be much larger than this. In one example, it is in the order of 100 ms. While it is possible to buffer the video frames and still show them at 30 fps, there would be a latency of at least 100 ms, since there is still additional processing that needs to be carried out once the position is known. For example, swinging at a typical speed of 1 m/s, the coil has moved 10 cm in 100 ms, which means the video shown on the screen is a long way off what is actually under the screen. For a user this would produce an unsatisfactory user experience.

The metal detector data also has different latency, which is dependent on the filtering performed within the metal detector, which has its own different latency, which is of the order of 120 ms. The latency of the metal detector data may be more or less than 120 ms. If further processing of the metal detector data in conjunction with the position data is performed, the latency will be much more than 120 ms, such as 200 ms or even more. Thus, the metal detector latency and the odometry latency is an issue for a synchronized display of the metal detector overlay information on the camera feed.

An exemplary way to address this issue and to improve latency in deriving the position is to overlay information on the camera feed and to have an IMU sensor which provides data at much higher rates, in the order of 500 Hz for example which has a period of 2 ms. Using the IMU for dead reckoning, the odometry is propagated every 2 ms. In another example, the position data may be propagated at other rates as long as it is a high data rate which is suitable to perform the dead-reckoning as described below.

Dead-reckoning is the process of calculating one's current position by using a previously determined position, or fix and advancing that position based upon known or estimated speeds over elapsed time and course. Thus, the propagated odometry (position and orientation) may diverge from its 'correct odometry'. However, if the propagation time is short enough the pose error may be brought to an acceptable level. This method brings the position latency to 2 ms. In another example, the position latency may be more than 2 ms. Other techniques such as time warping may be applied during the rendering process, which are well known in the field of augmented reality systems.

In relation to the metal detector latency, it may be in the range of 100 ms to 200 ms. To provide a low latency AR view with the metal detection information on the display screen, in one embodiment, there is provided a plurality of odometry streams of data, at least one is generated with real time metal detection information but with a high latency; and at least another one is generated with reduced pose accuracy but with a low latency (for example by using limited historical data or based on prediction). In addition, another odometry stream may be produced that contains accurate odometry at a nominal latency that may be used with metal detector data for additional processing. In combination, the plurality of odometry streams of data allows the metal detection information to be processed with good accuracy, and processed results may be presented in real time with low latency.

In one form, the display of the metal detection information with respect to the placement of the coil appears in the wake of its trajectory, like the vapour trail that succeeds the path of a plane. Then after some time when the user makes a second pass over the target the information from the first pass will be available on the AR display.

Figure 4:
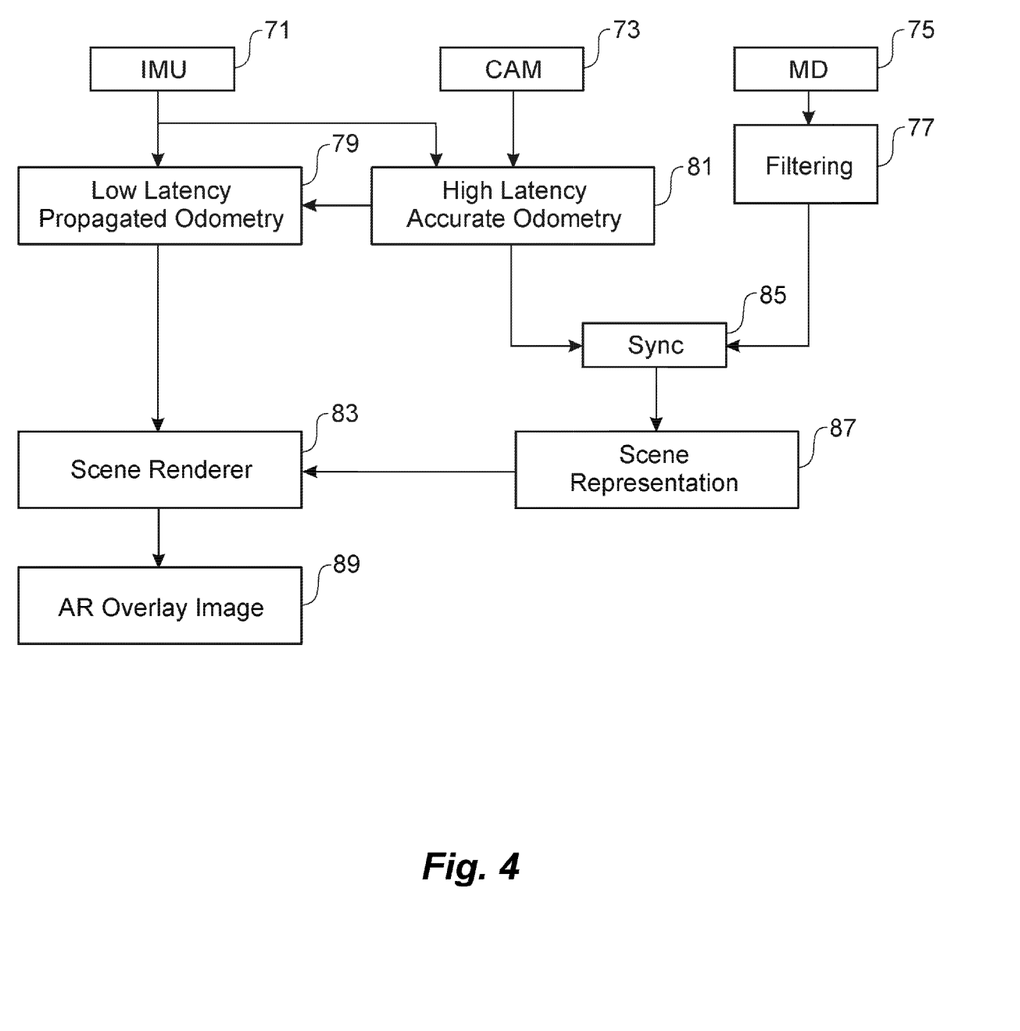
FIG. 4 shows an exemplary block diagram in which the Inertial Measurement Unit (IMU) sensor data, camera data and metal detector data are processed to produce an Augmented Reality (AR) overlay image with improved latency of AR overlay image.

FIG. 4 shows an exemplary block diagram in which the IMU sensor data, camera data and metal detector data are processed to produce an AR overlay image with improved latency of AR overlay image. The numbers below are for illustrative purpose only. In this example, the IMU 71 is running at 500 Hz, the camera (CAM) 73 is running at 30 Hz, and the metal detector (MD) 75 is running at 400 Hz, but with latency of 100 to 200 ms after Filtering 77. The sensor data from IMU 71 and camera 73 are processed together with a monocular visual odometry algorithm to provide high latency accurate odometry 81. The result of 81 along with the IMU sensor data 71 are then processed together with a dead reckoning algorithm to provide a low latency propagated odometry 79. The output of the low latency propagated odometry 79 feeds a scene renderer 83. The output of the high latency accurate odometry 81, together with the output of filtering 77, are time synchronized 85, which is then used to generate representation of the scene 87. The generated scene is then fed into scene renderer 83 which is receiving data from low latency propagated odometry 79 at a lower latency. The scene renderer operates at a low latency real time speed and generates rendered scenes using whatever the latest data available is from the scene representation 87. Thus, the AR overlay image 89 is with output of the low latency propagated odometry 79 at a high refresh rate and representation of scene 87 includes real-time metal detection information at a lower rate.

Fiducial Markers

In a metal detector with IMU and camera, the odometry produced by the visual processing are dependent on the relative position and orientation of the IMU with respect to the camera. The relative position and orientation of the IMU and camera are often fixed. However, the position and the orientation of the coil of the metal detector with respect to the camera and IMU are adjustable by a user of the metal detector. For example, the odometry may be projected to a static point, such as the top surface of the receive coil of the metal detector, to know its position. However, the length of the shaft and hence the position of the top surface, is adjustable by the user. Additionally, the tilt of the coil with respect to the shaft is adjustable by the user. The position of the receive coil is the position where the metal detection data originates. Thus, it is beneficial to know the position of the coil, to improve processing for heat map generation, and to enhance positioning or metal detection. It may be also beneficial to know the position of the ground relative to the camera and IMU, and the relative position of ground relative to the coil.

In one embodiment to find the position of the coil, there are provided visual tags or markers on the coil. These tags or markers, sometimes known as fiducials or fiducial markers, are special pictograms of known characteristics (placement, shape, size, colour etc.) that image processing systems may recognise and deduce information from. In one example, information may be deduced from the relative locations of two or more tags/markers. In another example, the tags consist of Quick Response (QR) codes, thus the location and orientation may be deduced within the actual tag itself. In one example, one QR code tag is placed on the coil. In another example, more than one QR tag and/or marker are placed on the coil. Once the pose of the coil is known, appropriate information may be calculated based on the pose of the coil.

In one embodiment, since the coil is in the field of view of the camera, the coil itself may be utilized to determine its position. For example, the processor may compare the size and orientation of the coil as captured by the camera to compute the position and orientation of the coil based on stored data, or based on the required transform between the captured position and stored data.

Further, fiducial markers may be used when the metal detector is in operation on an environment lacking distinctive features, such as clean smooth sand, or smooth snow. This assists the positioning system to track movement of the metal detector.

Fiducial markers to aid the positioning system need not be especially produced. They may be anything that would produce reasonably high contrast corner-like features in the camera image. It is advantageous if there are enough features such that a "feature cloud" is produced, where some part of the cloud remains in the camera field of view as the detector is being swung.

Heat Map Display

When plotting heat map images of targets on the display of a metal detector, the shaded area that represents target detections may be quite large. This makes it difficult to separate targets that are in close proximity to each other. The shaded area is a footprint of the target on the heat map displayed on the screen. The issue is more prevalent when the coil of the metal detector is relatively large as compared to the targets. For example, in one scenario, the coil of the metal detector is around 30 cm in diameter and the targets are in the order of centimetres. When the coil passes over a target it smears the target spatially.

Figure 5A:
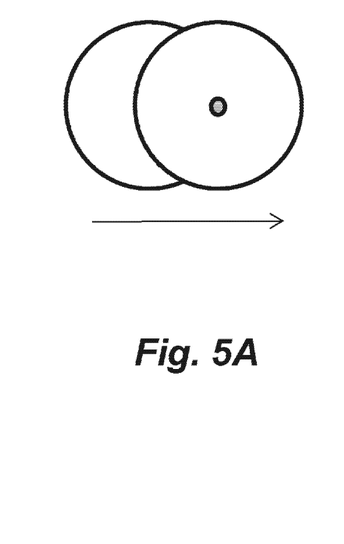
FIGS. 5A and 5B show building up a heat map during a single pass of a coil over a target, 5C shows the result after multiple passes of the coil over the target with different orientations.
Figure 5B:
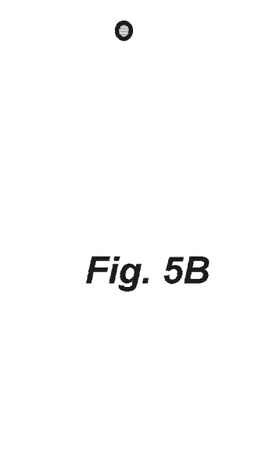
Figure 5C:
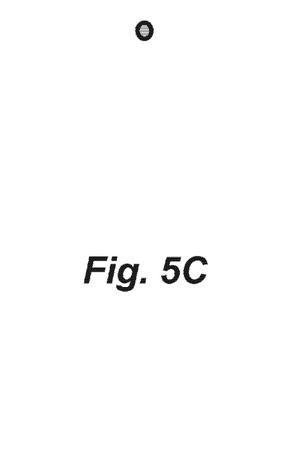

In an example, consider the following. There is a single target and one pass is made over the target with a monoloop coil. When any part of the coil is over the target, a binary response will be produced, was the target detected, or was the target not detected. Because the exact location of the target under the coil may not be determined, the entire area under the coil is shaded on a heat map visualisation. At the instant when the leading edge of the coil moves over the target the area under the coil is shaded. At some time later when the centre of the coil is over the target, the area under the target is again shaded. This is shown in FIG. 5A. Then at a further time when the lagging edge of the coil is about to leave the target, the area under the coil is again shaded, as shown in FIG. 5B. This is the total shaded area after a single pass. In typical detecting, when a target is identified an operator will usually make several passes over the target with different swinging orientations. The result of the shaded area after multiple passes over the target is shown in FIG. 5C. It is easy to see that the shaded area is substantially larger than the size of the target, with the shaded area extending one coil diameter in every direction.

To mitigate this issue, there is provided a technique to reduce the size of the shaded area and thus increase the target resolution to improve the target resolving power of the heat map display. This will enable easier separation of targets and junk using the heat map display. The technique is to utilise the trajectory related information when constructing the heat map. This means utilising the parts of the trajectory that have an absence of a target response, and not shading those parts of the trajectory.

Figure 6A:
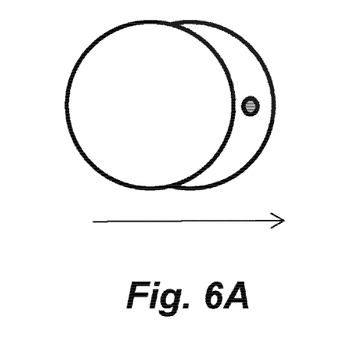
FIGS. 6A to 6C show building up a heat map during using a technique to improve the target resolution for a single pass of the coil over the target, 6D shows the result after multiple passes of the coil over the target with different orientations.
Figure 6B:
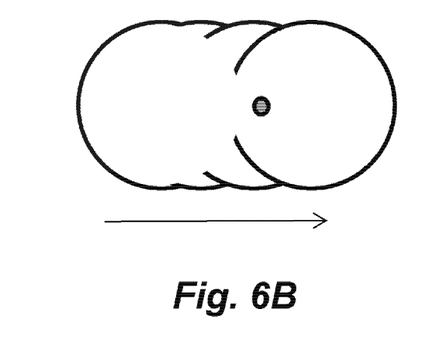
Figure 6C:
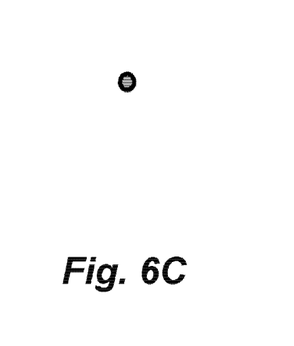
Figure 6D:
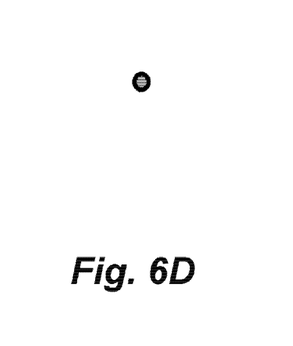

Replaying the previous example with this technique demonstrates the improvement. At the instant before the leading edge of the coil moves over the target there is no response, thus the area under the coil is not shaded. A short time later when the leading edge passes over the target a response is detected and the area under the coil is shaded, but excluding the area from the previous time instant when there was no response. This results in a partially shaded coil, as shown in FIG. 6A. At a further time instant before the trailing edge of the coil passes over the target, a response is detected and the area under the coil is shaded, as shown in FIG. 6B. At a further time instant when the trailing edge passes over the target, no response is detected, however some parts under the coil were shaded from a previous time instant, and these may be erased as the information from the present trajectory time instant indicates there is no target detected. This is shown in FIG. 6C. After multiple passes further sections may be erased where there was no target response detected, the result heat map display is shown in FIG. 6D.

The application of this technique does not require a complete scan of an area of interest. As new trajectory and detector response information become available, they may be processed with the existing heat map information to refine the resolution of the target in real-time. This is contrast to a number of existing methods that require a full scan of an area under test, such as deconvolution methods and other standard image processing algorithms.

A further addition to the implementation of this technique uses the height information of the metal detecting coil to control how the shading is applied. As the coil is lifted higher above the ground, the response to targets in the ground will become weaker due to the greater distance between the coil and target. It is possible that moving the coil above the ground while not actively detecting will inadvertently erase some of the shaded areas from the heat map. To help reduce this undesired behaviour, when the coil is raised above the ground, the strength of the shading is reduced. For example, if the coil is raised 15 cm off the ground, the shading or erasing is only applied at 20% of its normal amount. If the coil is lifted more than 20 cm off the ground, then the shading or erasing is halted.

In another embodiment, the shading is not a binary decision based on the detector response. The strength of the shading may be determined by the strength of the detector response to a target in the ground. For example, the stronger the target response, the darker the shading that is applied to the heat map. Furthermore, with additional passes of the detector coil over the target, the application of the shading could be additive so that an area representing the target on the heat map will gradually get darker with each pass over the target. Similarly, for erasing an area where there is no target response, additional passes will gradually remove the shading from that area of the heat map.

In another embodiment, the colour of the shading may be determined by the type of target identified by further processing of the target response. For example, if the target is ferrous the colour of the shading is blue, and if the target is non-ferrous the colour of the shading is red. Additionally, the colour of the non-ferrous targets could be determined by the conductivity or characteristic frequency of the detected targets.

Furthermore, the geometry and magnetic field profile of the coil may be used to control the strength of the shading. This could be applied so that the strength of the shading is not uniform under the coil. For example, if a monoloop is used, the region under the centre of the coil has more weighting that the region around the edge of the coil.

Miscellaneous

In one embodiment, there are provided gestures and/or motion inputs to control how the metal detector behaves, or initiates some function of the metal detector. For example, when the detector hovers near a target it goes into pinpointing mode to more accurately detect the position of a target.

In some metal detectors, a camera is used to provide a real time video feed to the display along with the metal detector information which is communicated to the user. For example, the metal detector information is communicated via audio. In another example, the metal detector information is communicated via on-screen indicators and/or haptic feedback. One way is to apply a first person AR view and overhead navigational view. Both may be showing an overlay of metal detection information and/or the pose of the coil on the display of the metal detector.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. For a hardware implementation, processing may be implemented within one or more application specific integrated circuit (ASIC), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it may be communicatively coupled to the processor via various means as is known in the art.

The present disclosure may use the term "comprise" (open-ended) or "consist essentially of" the components of the present disclosure as well as other methods or elements described herein. As used herein, "comprising" means the elements recited, or their equivalent in structure or function, plus any other element or elements which are not recited. The terms "having" and "including" are also to be construed as open-ended unless the context suggests otherwise. As used herein, "consisting essentially of" means that the claimed arrangement, method and system may include elements or steps in addition to those recited in the claim, but only if the additional elements or steps do not materially alter the basic and novel characteristics as claimed.

Where used herein, the term "and/or" when used in a list of two or more items means that any one of the listed characteristics may be present, or any combination of two or more of the listed characteristics may be present. For example, if a step is described as containing characteristics A, B, and/or C, the step may contain A feature alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, producing, establishing and the like, such as determining the estimated class labels, etc.

In this disclosure, the term "component" is used to refer to a part of a larger whole. In this application, reference is made to components of substantial things, such as magnetic ground whose components may include reactive and resistive components. Reference is also made to components of electrical signals, such as components due to the effects of components of magnetic ground upon the receive signal. In this application, cases of possible ambiguity of interpretation arising from confusion of the two applications of the term "components" will be resolved explicitly.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for detecting a target using a metal detector, comprising:
    transmitting a transmit magnetic field using a transmitter;
    determining positions of a receiver of the metal detector as the receiver changes positions;
    receiving receive magnetic fields due to the transmit magnetic field to produce receive signals associated with the determined positions using the receiver and receive electronics;
    estimating at least one property of at least one target which contributes to the said receive signals; wherein the step of estimating the one or more properties is dependent on a plurality of said receive signals associated with different determined positions of the receiver of the metal detector related to a current determined position in a selected relationship; and wherein the estimate of the at least one property of the at least one target is substantially insensitive to other targets contributing to the receive signals; and
    producing an audio output signal indicative of one or more targets, wherein the audio output signal is dependent on the at least one estimated property of the at least one target.

2. The method of claim 1, wherein the receive signals associated with the different determined positions are further associated with target information regarding the receive signals.

3. The method of claim 1, wherein the plurality of said receive signals associated with different determined positions comprise receive signals associated with positions within a predetermined distance from the current determined position.

4. The method of claim 1, wherein the plurality of said receive signals associated with different determined positions comprise receive signals associated with positions where the receiver has been located within a predetermined time period ago.

5. The method of claim 1, wherein the metal detector is controllable to be in a metal detection mode or a pinpoint mode; wherein during an operation of the metal detector in the metal detection mode, the receiver is swung side-to-side; and during an operation of the metal detector in the pinpoint mode, the receiver is moved close to an area of interest; and wherein the audio output signal in the pinpoint mode is used to present the position or identity, or both, of the at least one target to a user of the metal detector.

6. The method of claim 5, wherein during the pinpoint mode, the receive signals are processed such that the audio output signal is not affected by a change of a height of the receiver from the at least one target.

7. The method of claim 1, wherein the audio output signal is modulated to indicate a current proximity of the receiver of the metal detector to the at least one target.

8. The method of claim 1, wherein the audio output signal is modulated to indicate the identity of the at least one target.

9. The method of claim 1, wherein the plurality of said receive signals associated with different determined positions are further used to reduce unwanted noise.

10. The method of claim 1, wherein the audio output signal is configured to discriminate the at least one target from a plurality of targets within a close proximity from the target, where the close proximity means within 0 to 10 cm away.

11. A non-transitory computer readable medium that stores instructions which, when executed by a processor of a metal detector, causes the metal detector to perform the method of claim 1.

12. A metal detector configured to perform a method comprising:
    transmitting, via a transmitter, a transmit magnetic field;
    determining, via a positioning device, positions of a receiver of the metal detector as the receiver changes positions;
    receiving, via the receiver and receive electronics, receive magnetic fields due to the transmit magnetic field to produce receive signals associated with the determined positions;
    estimating, via a processor, at least one property of at least one target which contributes to the said receive signals; wherein the step of estimating the one or more properties is dependent on a plurality of said receive signals associated with different determined positions of the receiver of the metal detector related to a current determined position in a selected relationship; and wherein the estimate of the at least one property of the at least one target is substantially insensitive to other targets contributing to the receive signals; and
    producing, via the processor, an audio output signal indicative of one or more targets, wherein the audio output signal is dependent on the at least one estimated property of the at least one target.

* * * * *